(12) United States Patent
Andreas

(10) Patent No.: US 6,944,697 B2
(45) Date of Patent: *Sep. 13, 2005

(54) SERIAL DEVICE DAISY CHAINING METHOD AND APPARATUS

(75) Inventor: David C. Andreas, Austin, TX (US)

(73) Assignee: Silicon Laboratories, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/699,811

(22) Filed: Nov. 3, 2003

(65) Prior Publication Data

US 2004/0093450 A1 May 13, 2004

Related U.S. Application Data

(63) Continuation of application No. 09/573,001, filed on May 17, 2000, now Pat. No. 6,816,933.

(51) Int. Cl.[7] .............................................. G06F 13/00
(52) U.S. Cl. .......................................... 710/110; 710/8
(58) Field of Search ........................ 710/110, 49, 8–10, 710/3, 69, 100

(56) References Cited

U.S. PATENT DOCUMENTS

| | | |
|---|---|---|
| 3,784,910 A | 1/1974 | Sylvan |
| 4,683,530 A | 7/1987 | Quatse |
| 5,291,490 A | 3/1994 | Conti et al. |
| 5,319,598 A * | 6/1994 | Aralis et al. ............ 365/189.12 |
| 5,577,172 A | 11/1996 | Vatland et al. |
| 6,148,076 A * | 11/2000 | Eriksson et al. ........ 379/387.01 |

OTHER PUBLICATIONS

"Processor Intercommunication Register" IBM Technical Disclosure Bulletin, Sep. 1990, US vol. 33, Issue 4, P. #309–311, Publication Date Sep. 1, 1990, Cross reference 0018–8689–33–4–309.

* cited by examiner

Primary Examiner—Tim Vo
Assistant Examiner—Trisha Vu
(74) Attorney, Agent, or Firm—Davis & Associates; William D. Davis

(57) ABSTRACT

A method includes the step of serially clocking a mask value through a plurality of subscriber line interface circuits (SLICs) until each SLIC stores a corresponding portion of the mask value, and serially communicating a command to the plurality of SLICs. Each SLIC responds to the command only if enabled by the corresponding portion of the mask value.

20 Claims, 6 Drawing Sheets

SERIAL DEVICE DAISY CHAINING METHOD AND APPARATUS

CROSS-REFERENCE TO RELATED APPLICATIONS

This application is a continuation of application Ser. No. 09/573,001 filed May 17, 2000, now U.S. Pat. No. 6,816,933.

FIELD OF THE INVENTION

This invention relates to the field of communications. In particular, this invention is drawn to communication between a bus master and associated serial devices.

BACKGROUND OF THE INVENTION

Several communication techniques are available for enabling communication between a processor or a bus master and a plurality of serial devices coupled to the processor. Typically, the processor communicates with one or more serial devices sharing a common communication bus. In the event the processor needs to communicate information to a specific serial device, the processor must be able to distinguish the devices from each other. Various techniques are available to enable individual identification or selection of the serial devices.

For example, a separate select line may be used to enable each serial device. The serial devices are capable of responding or acting on information communicated when their respective select lines are asserted. One disadvantage of this technique is the imposed requirement for dedicated pins or exclusive signal lines on the processor to handle the device select signals. In particular, a separate select signal line is required for each serial device to be uniquely enabled.

Another technique uses jumpers, switches, or other hardware mechanisms associated with the serial devices to permit assignment of a unique identifier for each serial device. Each serial device only responds to commands with an accompanying identifier that matches that of the serial device as determined by the jumpers, switches or other hardware.

One disadvantage of this technique is that knowledge of other devices in the system is necessary to avoid duplicate device identifier assignments. Serial devices cannot be simply replaced or added into the system without first assigning a unique identifier. In addition, each device must have the ability to be configured for any one of a number of potential identifier assignments. For integrated circuit based serial devices additional packaging pins may be required to enable the serial device to support more than one potential identifier assignment.

SUMMARY OF THE INVENTION

In view of limitations of known systems and methods, methods and apparatus to enable unique identification of serial devices having a common bus for communication with a bus master are described.

One method includes the step of serially clocking a mask value through a plurality of serial devices until each serial device stores a corresponding portion of the mask value. The plurality of serial devices is provided with a command. Each serial device responds to the command only if enabled by the corresponding portion of the mask value.

Another method includes the step of initializing a plurality of serial devices to one of a first mode (i.e., normal mode) and a second mode (i.e., daisy chaining mode). If the plurality of devices is in the second mode, a mask value is serially clocked through the plurality of serial devices until each serial device stores a corresponding portion of the mask value. Wherein when provided with a command, every serial device responds to the command when in the first mode. Only serial devices enabled by the corresponding portion of the mask value respond to the command when in the second mode.

One serial device apparatus includes a memory coupled to receive a clock signal and a serial data in (SDI) signal carrying mask values, commands, and data, the memory providing a clocked SDI signal. A multiplexer is coupled to select one of the SDI signal and the clocked SDI signal as an SDI THRU signal in accordance with a mode control signal. A mode control provides the mode control signal. Responsive to the mode control signal the multiplexer selects the clocked SDI signal as the SDI THRU signal when the SDI signal carries the mask value, wherein the multiplexer selects the SDI signal when the SDI signal carries commands or data. When supporting multimodal operation, the mode control performs the above steps when the device is in a daisy chain mode and the mode control ensures the multiplexer selects only the SDI as the SDI THRU signal when the serial device is in a normal mode.

One apparatus includes a plurality of serial devices coupled to a bus master by a bus. The bus master clocks a mask value through the plurality of serial devices until each serial device stores a portion of the mask value. Each of the plurality of serial devices responds to a subsequent bus master issued command only if enabled by the corresponding portion of the mask value.

In various embodiments, the plurality of serial devices may be substantially identical. Alternatively, the plurality of serial devices may be heterogeneous. In one embodiment, at least one of the devices comprises a subscriber line interface circuit.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
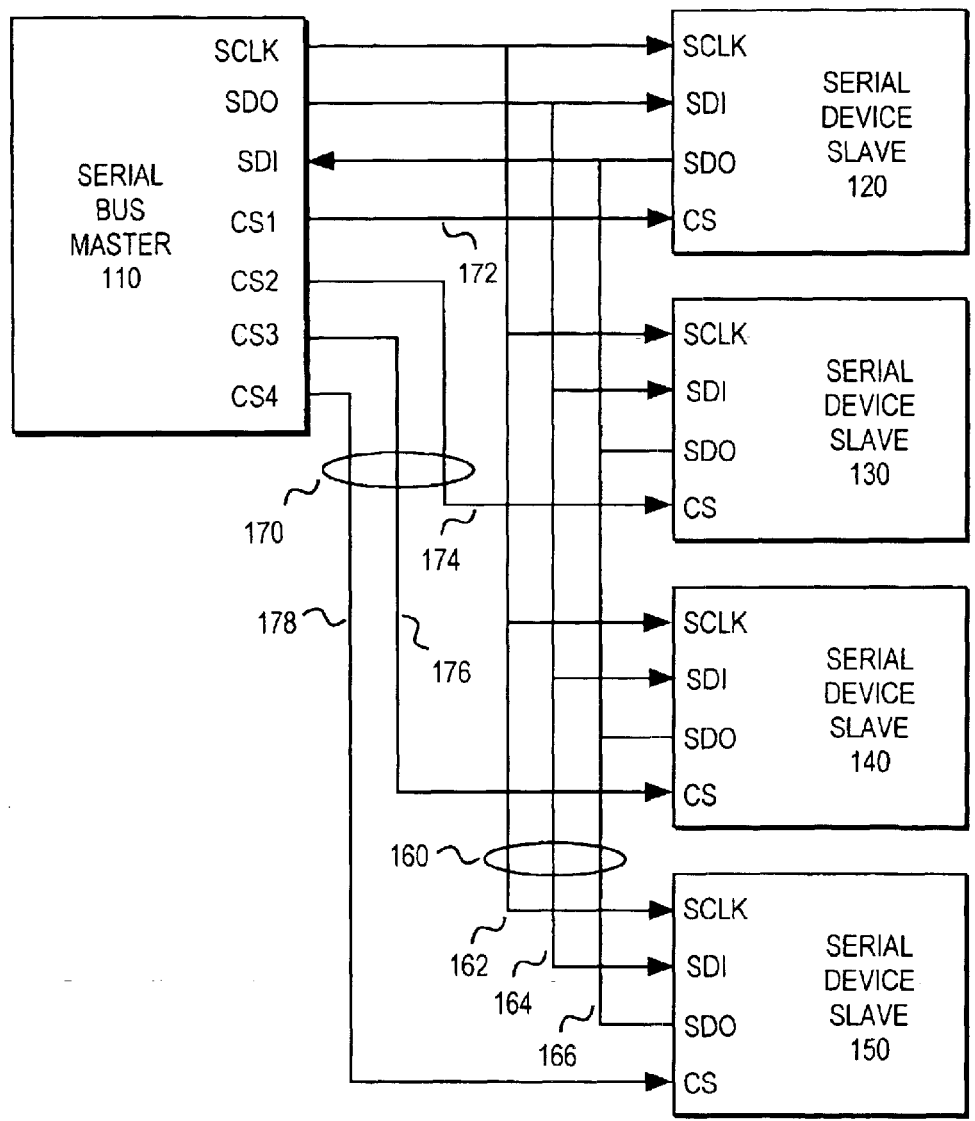
FIG. 1 illustrates a plurality of serial devices coupled to a serial bus master.
Figure 1:
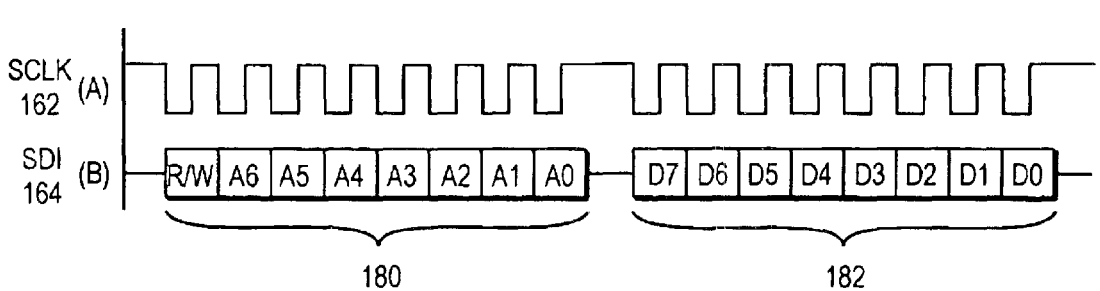

FIG. 1 illustrates one embodiment of a bus master 110 coupled to a plurality of serial devices 120–150 sharing a common serial communications bus 160. The serial communications bus 160 carries commands, addresses, and data between the bus master and the serial devices. Typically, the commands include read and write commands associated with specific addresses.

In this embodiment, communications bus 160 includes a clock signal (SCLK 162), a serial data in (SDI 164) to the serial devices from the serial data out (SDO) of the bus master, and a serial data out (SDO 166) from the serial devices to the SDI of the bus master. Commands, addresses, and data are effectively broadcast to all other devices sharing the same serial communications bus.

In order to select a specific serial device for acting on a command or responding to other information communicated on the bus, the serial devices are selectively enabled by a device select signal. In one embodiment, the serial devices include integrated circuit packages and the device select signals are referred to as chip select signals.

Each serial device has a chip select input (CS) that is asserted to indicate that the chip should respond to information being broadcast on the serial communications bus. In order to support unique identification of a plurality of serial devices using the chip select signals, bus master 110 must be capable of providing individual chip selects, one for each serial device. In the illustrated embodiment, bus master 110 includes a separate chip select signal (e.g., CS 172, CS 174, CS 176, CS 178) to enable selecting any one of the serial devices 120–150 uniquely.

In one embodiment, the information is communicated to the serial devices using the protocol indicated by waveform 164 of timing diagram 190. In particular, an m-bit command word 180 followed by an n-bit data word 182 is serially broadcast to the plurality of serial devices. Each transmitted bit is communicated substantially simultaneously to all the serial devices. Clock signal SCLK 162 is provided by bus master 110 for synchronous transmission of the information. As illustrated, the command and data words are 8 bits each. In this embodiment, the command word includes a plurality of address bits A0–A6 and a R/W bit to indicate whether a read or write operation is to be performed on the indicated address.

Figure 2:
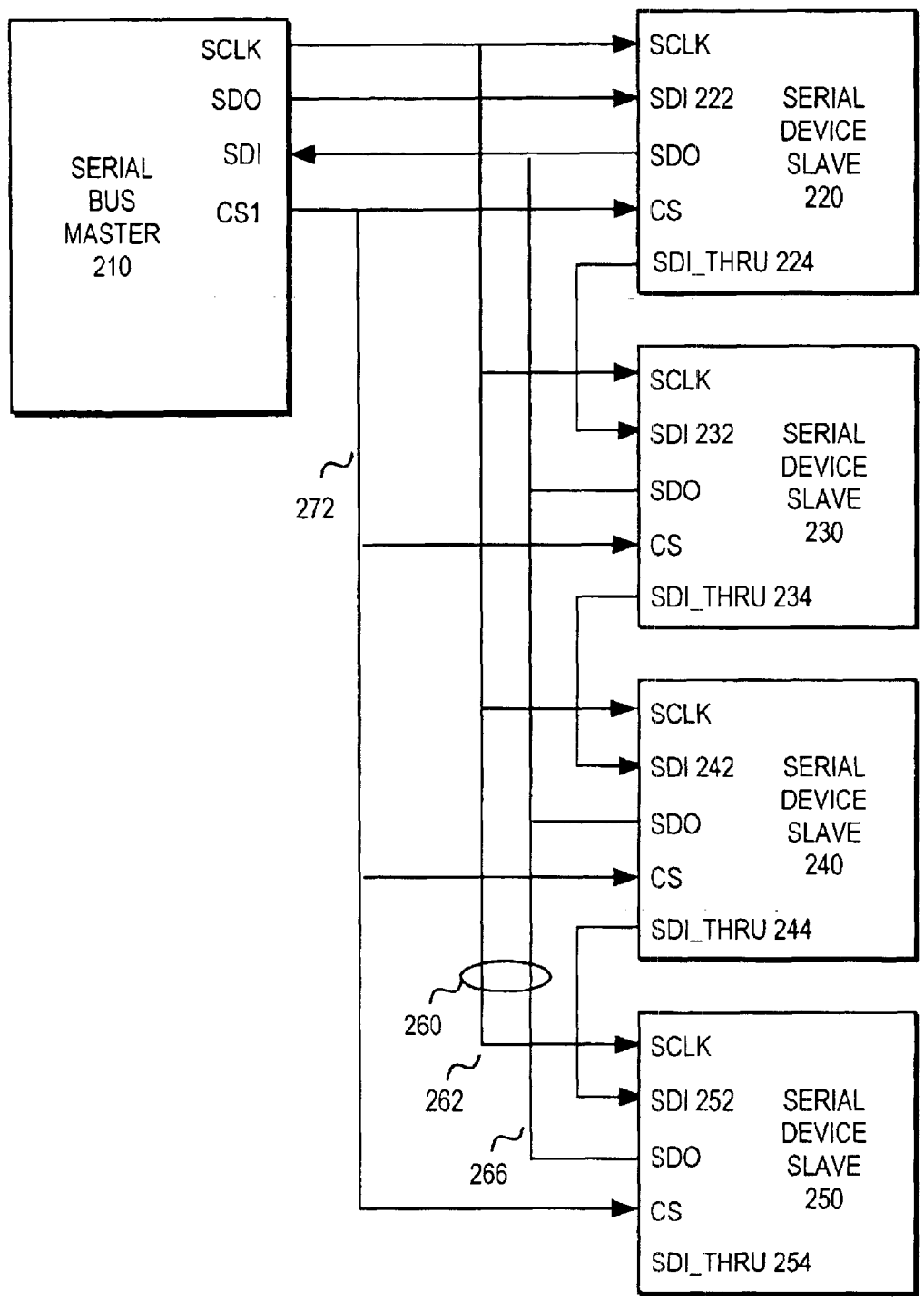
FIG. 2 illustrates a plurality of daisy chained serial devices coupled to a serial bus master.

FIG. 2 illustrates a bus master 210 coupled to a plurality of serial devices 220–250 sharing a common serial communication bus 260. In this embodiment, the plurality of serial devices is coupled in "daisy chain" fashion with respect to the SDI signal. The SDI signal is not part of the shared communication bus 260. The devices are "daisy-chained" such that the SDI input for any serial device is provided by the SDI THRU output of a preceding device in the chain, with the exception of the first device 220 in the chain which receives its SDI signal from the SDO of the bus master 210. Each serial device receives its SDI signal from a preceding device rather than from the serial communication bus 260.

As illustrated, the SDI input for the first device is provided by the bus master. Thus, the SDI 222 of serial device 220 is provided by bus master 210. The SDI 232 of serial device 230 is provided by SDI THRU 224 of preceding serial device 220. The SDI 242 of serial device 240 is provided by SDI THRU 234 of preceding serial device 230. Finally, SDI 252 for serial device 250 is provided by SDI THRU 244 of preceding serial device 240.

The serial communication bus 260 in common with all devices 220–250 includes the SDO 264 and SCLK 262 signals. All the serial devices in a group share the same chip select signal 272. A bus master with a plurality of chip selects allows for handling more than one group of serial devices.

Given that the chip select is shared with all serial devices in the same group, other mechanisms must be used to differentiate between chips in the same group. In order to differentiate between devices in daisy chain mode, the communication protocol of FIG. 1 is modified to enable distributing a mask value to the plurality of serial devices. The devices respond to a subsequent command only if enabled by their respective mask value portions.

Figure 3:
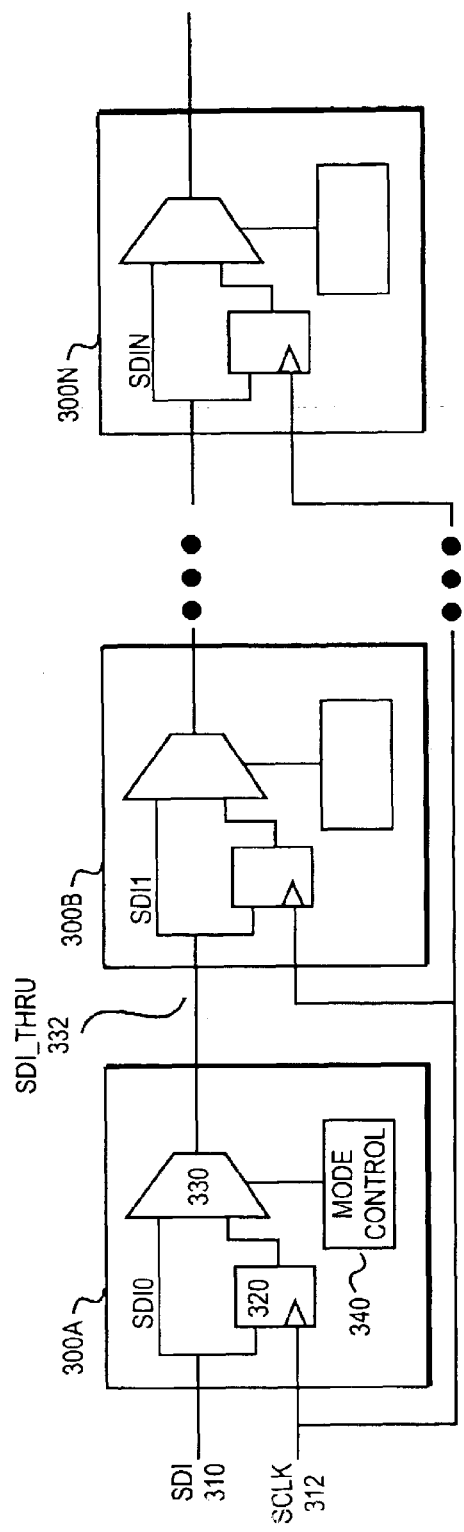
FIG. 3 illustrates a serial device having multimodal serial interface circuitry for operating in either a daisy chain mode or a normal mode.
Figure 3:
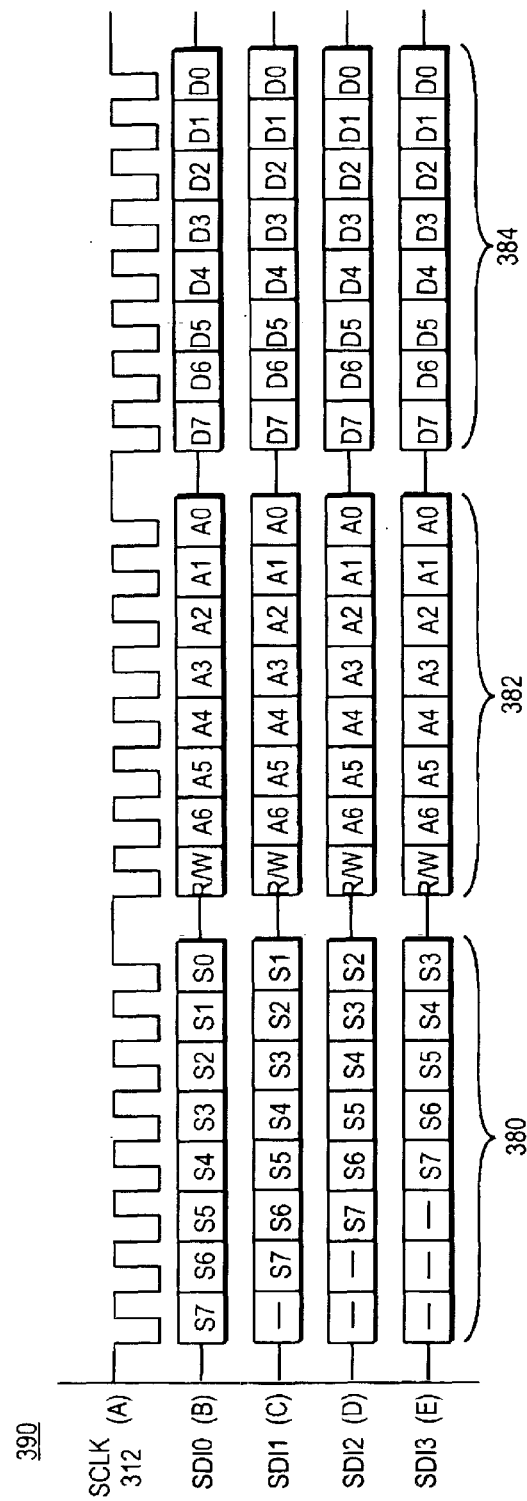

FIG. 3 illustrates a plurality of daisy chained serial devices with multimodal serial interface circuitry enabling either a daisy chain mode or a non-daisy chain (i.e., "normal") mode of operation. While in the normal mode, each device is enabled by asserting the corresponding chip select input. While in the daisy chain mode, the serial devices are enabled or disabled in part based on a mask value transmitted on the serial bus instead of exclusively through the chip select input. The communication protocol is modified to include the mask value when in the daisy chain mode. When in the daisy chain mode, devices can be uniquely specified even when the chip selects are asserted for more than one device.

Each serial device 300A–300N includes serial interface circuitry comprising a memory 320, a mode control 340, and a multiplexer 330 subject to mode control circuitry 340. Memory 320 latches the value of SDI 310 in accordance with the clock signal SCLK 312 to generate a clocked SDI signal. In one embodiment, memory 320 is a flip flop such as a "D" flip flop.

Assuming that the chip select (not shown) is enabled on all the chips, the mode control 340 determines whether SDI THRU 332 is the SDI 310 signal or the clocked SDI 310 signal as latched by memory 320. For each serial device (e.g., 300A), the signal selected by multiplexer (330) becomes the SDI THRU signal provided to the next serial device (300B) in the daisy chain.

Figure 4:
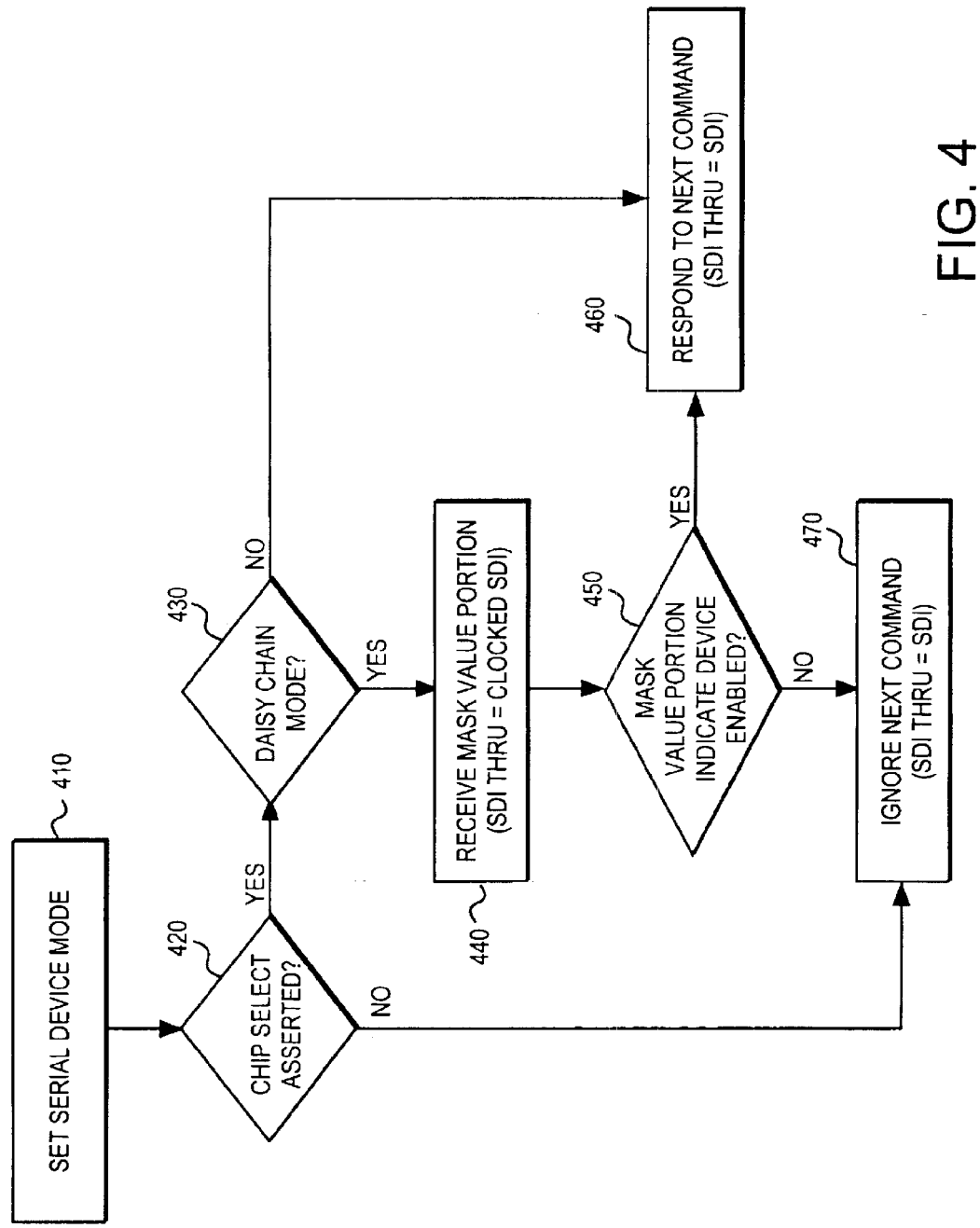
FIG. 4 illustrates a method enabling the multimodal serial interface circuit to communicate with a bus master with or without daisy chain coupling configuration.

FIG. 4 illustrates the operation of the multimodal serial interface circuitry of FIG. 3. The serial device mode is set as either normal or daisy chain mode in step 410. In one embodiment, a mode bit of a register of the device is initialized to a pre-determined value in order to select normal or daisy-chain mode.

If the chip select signal is not asserted as determined by step 420, then the device ignores the next command as indicated by step 470. Ignoring a command involves ignoring the command word (382) and corresponding data word (384). If the chip select signal is asserted, however, the mode of the serial device is determined in step 430. In one embodiment, this is accomplished by testing a mode bit of a register within the serial device. If the device is not in the daisy chain mode, then the device responds to the next command as indicated in step 460.

If the device is in the daisy chain mode, then it receives a mask value portion in step 440. Referring to the timing diagram 390 of FIG. 3, the daisy chain communication protocol requires an additional component 380. In particular, a k-bit mask value 380 is provided in addition to the m-bit command word 382 and the n-bit data word 384. In one embodiment, the mask value, command word, and data word are all the same length. In the illustrated embodiment, the mask value is an eight bit word. The mask value portions are allocated to their corresponding serial devices by distributing the k-bit mask value serially using the daisy chained SDI signal of the serial devices. Generally, each bit position in the mask value identifies a specific serial device (up to k devices) within the chain of devices for enabling or disabling.

The mask value is serially clocked from the bus master to the SDI input of the first serial device in the daisy chain. The SDI THRU output of the first device is provided to the SDI input of the next device in the chain. Accordingly, the SDI THRU signal for a device should be the same as the clocked SDI signal for that device while the mask value is being distributed. Mode control 340 causes multiplexer 330 to select the clocked SDI signal while the mask value is being distributed. The mask value cascades through the serial devices. In one embodiment, each serial device treats the kth bit clocked through it as its corresponding mask value portion. In one embodiment, for example, the kth bit might correspond to the least significant bit. The serial distribution of the mask bits S0–S7 to a plurality of daisy chained serial devices SDI0–SDI3 is illustrated by signals 390(*a*)–390(*e*).

Referring to FIGS. 3 and 4, after each device has received its corresponding mask value portion, step 450 determines whether the device is enabled in accordance with the mask value portion. If so, then the device responds to the next command as indicated in step 460. "Next command" refers to the command word (382) and corresponding data word (384) following the mask value (380). Otherwise, the next command (382) is ignored in step 470. When the daisy chain mode is selected, SDI THRU should be the same as SDI in steps 460 and 470. This ensures that subsequent serial devices are able to receive the next command.

Although the mask value may be distributed by serially clocking a given mask value through the daisy chain, command and data words must always be provided to all serial devices. Accordingly, the mode control 340 ensures that the output of the multiplexer is the clocked SDI signal while the mask value is being distributed. The mode control 340 then ensures that SDI THRU is the same as SDI when the command and data words are being transmitted.

In one embodiment, the mode control includes a state machine. While in the daisy chain mode, the state machine ensures that the multiplexer selects the clocked SDI signal for the first k bits (i.e., during the transmission of the mask value). The state machine ensures that the multiplexer selects the non-clocked SDI signal for the remaining m bits and n bits of the command and data words, respectively. Thus the command word is serially broadcast to all serial devices substantially simultaneously. Similarly, the data word is serially broadcast to all serial devices substantially simultaneously. The mask value, however, is distributed until each serial device has its corresponding portion by serially clocking the mask value through the daisy chained serial devices.

Up to k serial devices may be uniquely specified using a k-bit mask value. The value of each bit determines whether its corresponding serial device is enabled or disabled. Thus a "1", for example, could be used for enabling devices and a "0" for disabling devices. Any subset of k devices (up to $2^k$ combinations) may be enabled or disabled using the mask value.

Assuming the mask value is communicated beginning with the most significant bit, then the least significant bit of the mask value controls the first device in the chain (i.e., closest to the bus master). Each successive significant bit controls consecutive serial devices further down the daisy chain such that identity corresponding to bit position within the mask value is inherently determined by position within the chain.

Figure 5:
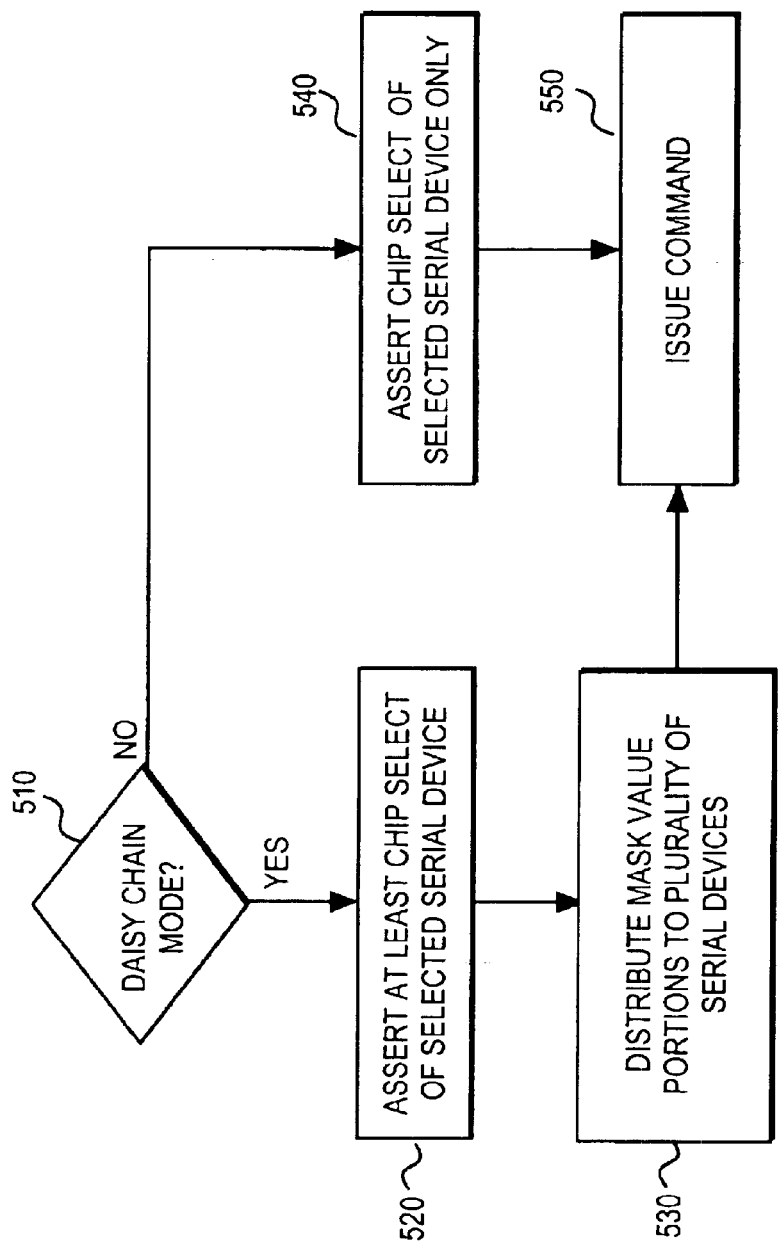
FIG. 5 illustrates a method implemented by a bus master to support communicating with serial devices with or without daisy chain coupling.

FIG. 5 illustrates a modified communications protocol from the perspective of the bus master when SDI daisy chaining is selected. In step 510, the bus master determines whether a daisy chaining mode is selected. If not, then the chip select of the selected serial device is asserted in step 540 to the exclusion of any unselected serial devices. The bus master then issues the command. No mask value needs to be sent when daisy chaining is not selected.

If SDI daisy chaining is selected, however, then the chip select of at least the selected device is asserted in step 520. In one embodiment, one or more serial devices (e.g., a group of serial devices) share the same chip select signal, thus an entire group of serial devices may be selected.

In daisy chaining mode, the bus master must communicate the mask value to the serial devices. Thus in step 530, the mask value portions are distributed to the plurality of serial devices. The serial devices will be enabled in accordance with the value of their respective mask value portions. In one embodiment, mask value portions are distributed to the plurality of serial devices by clocking a mask value through the plurality of serial devices. The serial devices are inherently associated with one or more mask value bits in accordance with the position of a given serial device in the chain of serial devices.

The bus master may be a processor. Alternatively, the bus master may be a less sophisticated device such as an application specific integrated circuit (ASIC). The serial devices may be all of a same type of device (i.e., homogeneous group) or the group may have different types of devices (i.e., heterogeneous group). In one embodiment, the plurality of serial devices includes at least one subscriber line interface circuit or is otherwise coupled to a subscriber line.

One advantage of the multimodal interface circuitry is that it enables a single serial device incorporating it to be compatible with either a daisy chained configuration of FIG. 2 or the non-daisy chained configuration of FIG. 1. Moreover, the plurality of serial devices incorporating such circuitry may be operated as if they are in a normal mode even when physically coupled in a daisy chain configuration.

The multimodal interface circuitry may be particularly suited for use with serial devices comprising subscriber line interface circuits or otherwise coupled to a subscriber line. Subscriber line interface circuits are typically found in the central office exchange of a telecommunications network. A subscriber line interface circuit (SLIC) provides a communications interface between the digital switching network of a central office and an analog subscriber line. The analog subscriber line connects to a subscriber station or telephone instrument at a location remote from the central office exchange.

The SLIC is expected to perform a number of functions often collectively referred to as the BORSCHT requirements. BORSCHT is an acronym for "battery feed," "overvoltage protection," "ring," "supervision," "codec," "hybrid," and "test," which are well known in the art.

Figure 6:
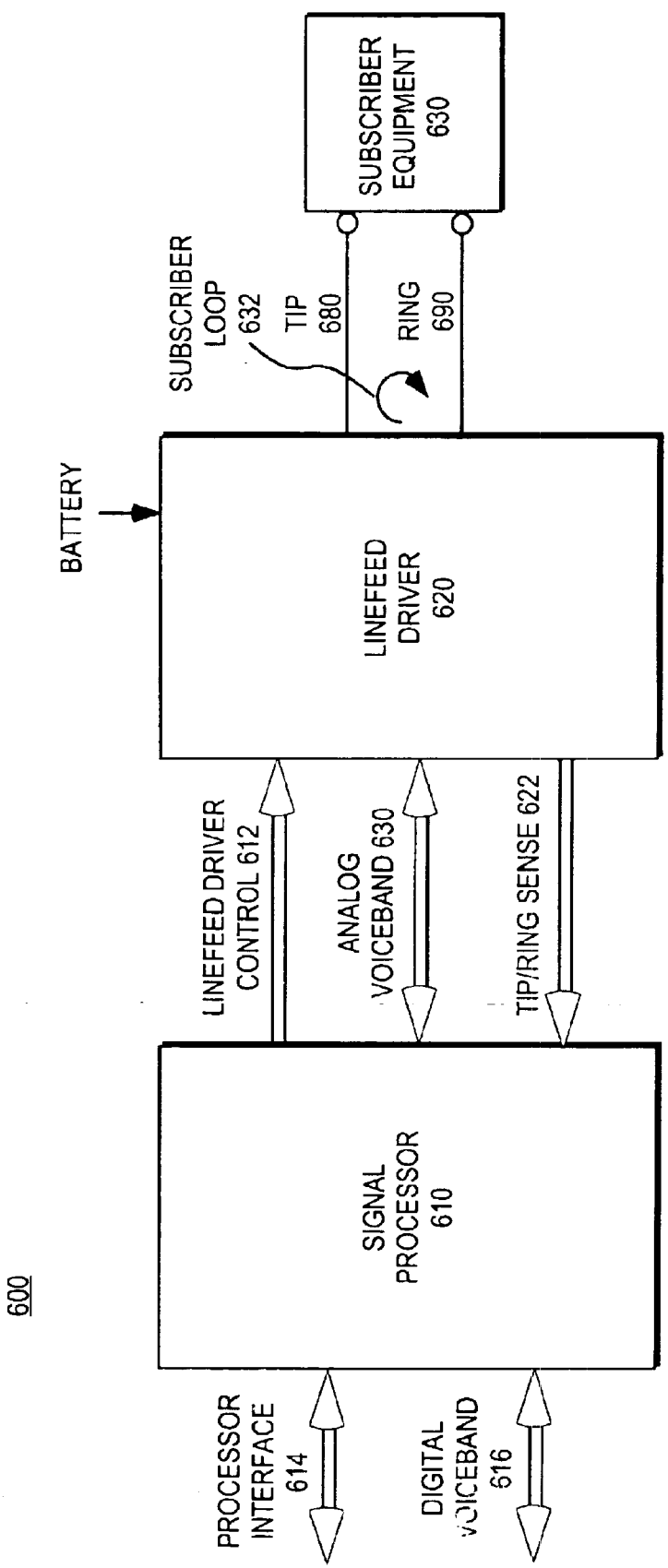
FIG. 6 illustrates a serial communication device comprising a subscriber line interface circuit.

FIG. 6 illustrates elements of one embodiment of a SLIC 600 typically associated with plain old telephone services (POTS) telephone lines. In the illustrated embodiment, SLIC 600 has been partitioned into a signal processor 610 and a line driver 620. Components for implementing the BORSCHT requirements may be distributed between the signal processor 610 and the linefeed driver 620.

SLIC 600 provides a digital voiceband interface 616 for communication between a digital switching network and subscriber loop 632 including subscriber equipment 630. SLIC 600 also includes a processor serial interface 614. The subscriber loop 632 communicates analog data signals (e.g., voiceband communications) as well as subscriber line "handshaking" or control signals.

The subscriber line state is often specified in terms of the tip 680 and ring 690 portions of the subscriber line. The tip 680 and ring 690 signals are sensed by the linefeed driver 620 and provided to the signal processor 610 as tip/ring sense 622 for determining the subscriber line state. This feedback mechanism is used by the signal processor 610 to generate the proper linefeed driver control 612 signal to linefeed driver 620. The signal processor also handles communication of the analog voiceband data 630 between the subscriber equipment 630 and the digital voiceband interface 616.

The serial interface effectively enables programmatic control of battery control, battery feed state control, voiceband data amplification and level shifting, longitudinal balance, ringing currents, and other subscriber line control parameters as well as setting thresholds such as a ring trip detection thresholds and an off-hook detection threshold. Programmatic control enables using a same SLIC circuitry to support subscriber lines and digital switching networks with differing operational requirements.

The central telephone exchange described above is merely one example of a SLIC application communicating with subscriber equipment using the POTS ("plain old telephone system") interface. Other SLIC applications include private exchanges and "zero loop" applications. Zero loop applications often have a relatively short distance subscriber line between the subscriber equipment and the SLIC. This is often the case when subscriber equipment must interface with a non-POTS systems such as a network that uses different communication media or protocols. Various zero loop applications for SLICs include Integrated Services Digital Network (ISDN) modems, community antenna television (CATV) cable modems, digital subscriber line (DSL) modems, and wireless modems. The multimodal serial interface circuitry described above may be particularly useful when controlling banks of SLICs associated with different communication media or protocols. Other subscriber line applications include consumer premises equipment. The daisy chaining methods and apparatus described are not limited to subscriber line applications.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising the steps of:
    serially clocking a mask value through a plurality of serially coupled subscriber line interface circuits (SLICs) until each SLIC stores a corresponding portion of the mask value; and
    serially communicating a command to the plurality of SLICs, wherein each SLIC responds to the command only if enabled by the corresponding portion of the mask value.

2. The method of claim 1 further comprising the step of: providing the plurality of SLICs with data, wherein the mask value, the command, and the data are communicated on a same serial bus.

3. The method of claim 2 wherein the command is serially broadcast to the plurality of SLICs substantially simultaneously, wherein the data is serially broadcast to the plurality of SLICs substantially simultaneously.

4. The method of claim 2 wherein the mask value is a k-bit mask value, the command forms a portion of an m-bit command word, and the data is an n-bit data word, wherein the mask value, command word and data word have a same length (k=m=n).

5. The method of claim 1 wherein the command is a portion of a command word having a plurality of address bits identifying an address and a R/W bit to indicate whether a read or write operation is to be performed on the identified address.

6. A method comprising the steps of:
    initializing a plurality of subscriber line interface circuits (SLICs) to one of a first mode and a second mode;
    serially clocking a mask value through the plurality of SLICs until each SLIC stores a corresponding portion of the mask value, if the plurality of SLICs is in the second mode; and
    serially communicating a command to the plurality of SLICs, wherein every SLIC responds to the command when in the first mode, wherein only SLICs enabled by the corresponding portion of the mask value respond to the command when in the second mode.

7. The method of claim 6 further comprising the step of: providing the plurality of SLICs with data, wherein the mask value, the command, and the data are communicated on a same serial bus.

8. The method of claim 7 wherein the command is serially broadcast to the plurality of SLICs substantially simultaneously, wherein the data is serially broadcast to the plurality of SLICs substantially simultaneously.

9. The method of claim 6 wherein the mask value is a k-bit mask value, the command forms a portion of an m-bit command word, and the data is an n-bit data word, wherein the mask value, command word and data word have a same length (k=m=n).

10. The method of claim 6 wherein the command is a portion of a command word having a plurality of address bits identifying an address and a R/W bit to indicate whether a read or write operation is to be performed on the identified address.

11. An apparatus comprising:
    a bus master;
    a plurality of subscriber line interface circuits (SLICs); and
    a bus coupling the SLICs to the bus master, wherein the bus master serially clocks a mask value through the plurality of SLICs until each SLIC stores a portion of the mask value, wherein each of the plurality of SLICs responds to a subsequent command serially communicated by the bus master only if enabled by the corresponding portion of the mask value.

12. The apparatus of claim 11 wherein the bus master serially communicates data to the plurality of SLICs, wherein the mask value, the command, and the data are communicated on a same serial bus.

13. The apparatus of claim 12 wherein the bus master serially broadcasts the command to the plurality of SLICs substantially simultaneously, wherein the bus master serially broadcasts the data to the plurality of SLICs substantially simultaneously.

14. The apparatus of claim 12 wherein the mask value is a k-bit mask value, the command forms a portion of an m-bit command word, and the data is an n-bit data word, wherein the mask value, command word and data word have a same length (k=m=n).

15. The apparatus of claim 11 wherein the command forms a portion of a command word having a plurality of address bits identifying an address and a R/W bit to indicate whether a read or write operation is to be performed on the identified address.

16. A subscriber line interface circuit (SLIC) apparatus comprising:
- a memory coupled to receive a clock signal and a serial data in (SDI) signal carrying mask values, commands, and data, wherein the memory provides a clocked SDI signal;
- a mode control providing a mode control signal; and
- a multiplexer coupled to select one of the SDI signal and the clocked SDI signal as an SDI THRU signal in accordance with the mode control signal, wherein responsive to the mode control signal the multiplexer selects the clocked SDI signal as the SDI THRU signal when the SDI signal carries the mask value, wherein the multiplexer selects the SDI signal when the SDI signal carries commands or data, wherein the memory, mode control, and multiplexer reside within a same integrated circuit package.

17. The apparatus of claim 16 wherein the memory is a flip flop.

18. The apparatus of claim 16 wherein mask values are communicated as k-bit mask values, commands are communicated as a portion of m-bit command words, and data is communicated as n-bit data words, wherein the mask values, command words, and data words have a same length (k=m=n).

19. The apparatus of claim 16 wherein the commands are communicated as a portion of a command word having a plurality of address bits identifying an address and a R/W bit to indicate whether a read or write operation is to be performed on the identified address.

20. The apparatus of claim 16 wherein the mode control is configured to accommodate k-bit mask values, m-bit command words, and n-bit data words, wherein k=m=n.

\* \* \* \* \*